United States Patent Office 2,843,457
Patented July 15, 1958

2,843,457
PRODUCTION OF OXY ACIDS OF PHOSPHORUS

John C. Pernert, Niagara Falls, N. Y., assignor to Hooker Electrochemical Company, Niagara Falls, N. Y., a corporation of New York No Drawing. Application November 17, 1954
Serial No. 469,533

9 Claims. (Cl. 23—165)

This invention relates to the preparation of inorganic oxy acids of phosphorus and is more particularly concerned with such a process which utilizes a sodium salt of the acid and an inorganic acidic sulfate in a refrigeration technique to prepare aqueous solutions of these acids.

A principal object of the present invention is to provide an economical process for the preparation of aqueous solutions of oxy acids of phosphorus directly from readily available materials. Still a further object of the invention is the provision of a process for preparing relatively concentrated aqueous solutions of such acids. Another object of the invention is the provision of a process for disposing of waste acidic sulfate materials, by conversion to compounds having economic value. A further object of the present invention is the provision of a process for preparing oxy acids of phosphorus by providing a sodium salt of the desired acid, treating this salt in aqueous solution with an acidic sulfate, cooling the solution to cause crystallization of neutral sodium sulfate and separation of the sodium sulfate. Specific objects include the provision of processes for preparing hypophosphorous, phosphorous and phosphoric acids. Other objects will become apparent hereinafter.

The foregoing and additional objects are accomplished by providing an aqueous solution of the sodium salt of the desired acid, treating this solution with an acidic sulfate and refrigerating to cause crystallization of sodium sulfate which can then be removed as a solid phase. While the system water-sodium salt-acid sulfate is normally in equilibrium, it has unexpectedly been found that by cooling the mixture, sodium sulfate will crystallize, removing a large percentage of the sodium ion and sulfate ion. By removing the crystallized sodium sulfate from the solution, there remains a solution of the oxy acid of phosphorus containing some dissolved sodium sulfate therein. The resulting aqueous solution of the oxy acid of phosphorus has utility in most general applications therefor, or, it may be further purified by removal of the remaining sulfate ion utilizing a conventional barium technique.

Sodium acidic sulfates generally or sulfuric acid are suitable in the system, such as, for example, sulfuric acid, sodium bisulfate, trisodium hydrogen disulfate, or mixtures of any of these materials. By the very nature of the equilibrium, it is possible to utilize acidic sodium sulfate wastes in the present process with the production of a useful neutral sodium sulfate. This neutral sodium sulfate has an economic value, or can be easily disposed of, as contrasted with the acidic sodium sulfate used as starting material. Thus, not only has a novel method for the production of oxy acids of phosphorus been provided, but also a method for the elimination of undesirable acidic sodium sulfate waste mixtures.

The sodium sulfate hydrate that forms will be either the heptahydrate, the decahydrate, or mixtures of these, depending on the concentrations of various ions, rate of cooling, rate of stirring, et cetera. Conversion of sodium sulfate hydrates to anhydrous can be accomplished in conventional manner.

Sodium salts of the oxy acids of phosphorus which are suitable in the process of the present invention include, for example, sodium hypophosphite, sodium metaphosphite, sodium pyrophosphite, sodium phosphite, sodium metaphosphate, sodium triphosphate, sodium orthophosphate, sodium peroxy monophosphate, and sodium peroxy diphosphate, and their primary, secondary or tertiary salts. However, certain of these salts, or their acids, are unstable in aqueous solutions and will form the more stable acid. For example, when meta- and pyrophosphites are employed, they will form, in the presence of water, ortho-phosphorous (phosphorous) acid.

While the sodium salt of the oxy acid of phosphorus may be employed in a variable concentration, a rather concentrated solution is preferably employed. That is, a solution approaching saturation but still containing sufficient water to allow the formation of sodium sulfate hydrates is preferred, although solutions having as little as one gram mole per liter may be used. With such a dilute solution, a large quantity of ice must be formed before the sodium sulfate begins to crystallize. Where relatively concentrated solutions of the acid are employed, on cooling it may be necessary to add water as the cooling progresses, in order that sufficient water will be present to allow formation of the hydrates of sodium sulfate.

Desirably, the hydrogen ion mole concentration will be equivalent to the mole concentration of the anion of the oxy acid of phosphorus present in solution. Stated another way, desirably, the ratio of sodium ion mole concentration to sulfate ion mole concentration will be 2.0 to 1.0, however, it is to be understood that ratios as high as 3.0 to 1.0 or as low as 1.5 to 1.0 are operative, but they will result in poorer overall yields. Where an excess of the sodium ion is present, contamination of the solution by the sodium salt of an oxy acid of phosphorus occurs, whereas, with insufficient sodium, contamination by the sulfate ion occurs. As crystallization is accomplished, it may be desirable to add either more of the acidic sulfate or more sodium ion in the form of a sodium salt of the oxy acid of phosphorus, if a satisfactory adjustment of the sodium and sulfate ion concentrations have not been accomplished at the outset of the crystallization technique. Thus, the amount of hydrogen ion added initially may be approximated and as incremental reduction in temperature and removal of the crystallizate is accomplished, adjustment by the addition of acidic sulfate or a sodium salt made. This minimizes contamination of the final products.

While the temperature normally used in the procedure of the present invention will be somewhat below fifteen degrees centigrade, it is to be understood that a proper selection of anion and cation concentrations will govern the temperature at which a crystallizate may be separated without contaminants and yield the highest degree of purification of the acid solution. In most instances, where it is desired to remove as much of the sodium and sulfate ion as possible, the temperature will be as low as minus forty degrees centigrade (—40° C.) (or as close as possible to the freezing point of the eutectic), however, if a less concentrated solution is desired, and contamination by sodium and sulfate ions is not a problem, temperatures higher than this, such as minus fifteen degrees centigrade, or minus thirty degrees centigrade, are satisfactory.

The product is an aqueous solution of an oxy acid of phosphorus containing sodium sulfate dissolved therein. If further purification is desired, barium salts may be used to precipitate barium sulfate. However, for most purposes, this additional treatment will not be necessary. Of course, the amount of sodium sulfate removed will also be dependent on the final temperature of cooling.

The following examples are given to illustrate the process of the present invention, but are not to be construed as limiting.

EXAMPLE 1

A mixture of 596 grams of a saturated sodium phosphite solution, 480 grams of sodium bisulfate, and 449 grams of water was warmed to cause complete solution of all the ingredients. The solution was cooled in a water bath and seeded, at intervals, with crystals of sodium sulfate decahydrate. Crystallization started at approximately 24 degrees centigrade and a heavy slurry was formed by cooling to eighteen degrees centigrade. At eighteen degrees centigrade, the crystals were filtered off, and a sample of the mother liquor was analyzed. Thereafter, the mother liquor was cooled to three degrees centigrade in an ice bath, and in a deep freezer at minus twenty-three (−23) degrees centigrade, the thick slurries of crystals were filtered, and the mother liquors analyzed. The results are tabulated in the following table:

Table 1

|  | Original Liquor | Mother Liquor | | |
|---|---|---|---|---|
| Temperature, °C | | 18 | 3 | −23 |
| Volume (liters) | 1.000 | 0.680 | 0.510 | 0.235 |
| Spec. Gravity | 1.330 | 1.256 | 1.176 | 1.230 |
| $H_3PO_3$ (grams/liter) | 116 | 171 | 229 | 495 |
| $Na_2SO_4$ (grams/liter) | 376 | 244 | 105 | 64 |
| $H_2O$ (grams/liter) | 838 | 841 | 842 | 671 |
| $Na_2SO_4 \cdot XH_2O$ crystallized (cumulative grams) | | 475 | 730 | ¹ 818 |
| Yield of $Na_2SO_4 \cdot XH_2O$ based on $Na_2SO_4$ in original liquor (cumulative percent) | | 55.7 | 85.7 | 96.0 |

¹ Additionally, the crystals contained 233 grams of ice.

EXAMPLE 2

Three hundred ninety-two (392) grams of fifty percent sulfuric acid solution having a specific gravity of 1.395 at twenty degrees centigrade, was mixed with 596 grams of a saturated sodium phosphite solution. The solution so-made had a specific gravity of 1.385 and weighed 988 grams. Upon cooling the solution, crystallization was first observed at 21 degrees centigrade, and when the temperature reached minus seven (−7) degrees centigrade, there was a heavy slurry of coarse crystals. These crystals were removed by filtration and the mother liquor which resulted cooled in a deep freezer to minus twenty-three (−23) degrees centigrade with occasional shaking. The slurry of crystals was removed by filtration and a representative sample of the mother liquor was cooled to minus forty-four (−44) degrees centigrade, and a eutectic mixture formed.

The results of the above example may be tabulated as follows:

EXAMPLE 3

One hundred ninety-six (196) grams of fifty percent sulfuric acid, having a specific gravity of 1.400 containing one mole of sulfuric acid, was mixed with 276 grams of primary sodium phosphate, $NaH_2PO_4 \cdot H_2O$ (two moles) and 78 grams of water. The salt dissolved readily forming a solution having a specific gravity of 1.517 at twenty degrees centigrade. The mixture was placed in a deep freezer and cooled to minus twenty (−20) degrees centigrade. The thick slurry which resulted was filtered and the filtrate returned to the freezer. After 24 hours at minus twenty (−20) degrees centigrade, the solution was found to be filled with very fine crystals and was again filtered. Due to the high viscosity of the solution and the small crystal size, it was not possible to obtain a true representative sample. The filtrate was therefore returned to the freezer for 48 hours. After this period of time, the solution was found to contain a few large crystals from which it could be easily decanted. A quantity of the mother liquor at a temperature of minus twenty-three (−23) degrees centigrade was obtained for analysis. The following table tabulates the results of this example:

Table 3
COMPOSITION OF SOLUTIONS

|  | Original | Final |
|---|---|---|
| Temperature | | −23° C. |
| Volume (liters) | 1.000 | .787. |
| Specific Gravity | 1.517 | 1.450. |
| $H_3PO_4$ (grams/liter) | 542 | 688. |
| $Na_2SO_4$ (grams/liter) | 393 | 206. |
| $H_2O$ (grams/liter) | 582 | 556. |
| $H_2O$ Crystallized (grams) | | 145 as hydrate. |
| $Na_2SO_4$ Crystallized (grams) | | 231 anhydr. basis. |
| Yield of $Na_2SO_4$ | | 58.8% by weight $Na_2SO_4$ in original. |
| $H_3PO_4$ Percent by Weight | | 47.5 grams/100 grams solution. |

The ratio of sodium sulfate times water in the crystals corresponds to $Na_2SO_4 \cdot 4.95H_2O$. This indicates that the solid phase was a mixture of sodium sulfate anhydrous and sodium sulfate heptahydrate, since only hepta- and decahydrates of sodium sulfate are known.

EXAMPLE 4

Two hundred five and one-half (205.5) grams of sodium hypophosphite $NaH_2PO_2$ (85.6 percent pure) was dissolved in 284 grams of water and 57.3 milliliters of ninety-five percent sulfuric acid was added thereto. The resulting solution contained two gram moles of hypophosphorous acid to one gram mole of sodium sulfate. The solution was cooled to four degrees centigrade, whereupon crystals of sodium sulfate decahydrate began to be deposited. Cooling was continued and after thirty minutes at minus four (−4) degrees centigrade, the slurry was filtered. The moist crystals weighed 290 grams. The filtrate had a specific gravity of 1.26 at 23 degrees centigrade. Analysis showed it contained sulfate equivalent to 98 grams per liter of sodium sulfate.

Table 2

|  | Original Solution | Mother Liquor | | |
|---|---|---|---|---|
| Temperature, °C | | −7 | −23 | −44 |
| Volume (liters) | 1.000 | 0.491 | 0.452 | 0.357 |
| Spec. Gravity | 1.385 | 1.275 | 1.260 | 1.296 |
| $H_3PO_3$ (grams/liter) | 247 | 503 | 546 | 692 |
| $Na_2SO_4$ (grams/liter) | 404 | 110 | 62 | 15 |
| $H_2O$ (grams/liter) | 734 | 662 | 652 | 589 |
| $Na_2SO_4 \cdot XH_2O$ crystallized (grams) | | 794 ($Na_2SO_4:9.2H_2O$) | 853 ($Na_2SO_4:7.97H_2O$) | ¹ 904 |
| Yield of $Na_2SO_4 \cdot XH_2O$ based on $Na_2SO_4$ in original liquor (cumulative percent) | | 86.6 | 93.0 | 98.7 |

¹ 904 grams $Na_2SO_4:10H_2O$ plus 18 grams ice.

The filtrate was again cooled in an alcohol-Dry Ice bath to minus thirty (—30) degrees centigrade, held at this temperature for ten minutes and filtered. The moist crystals weighed 39.8 grams. The filtrate now contained by analysis 17.8 grams per liter sodium sulfate. Further cooling of the filtrate to minus thirty-five (—35) degrees centigrade produced largely ice crystals, showing that the acid concentration was further increased by freezing.

EXAMPLE 5

An aqueous solution weighing 436 pounds and containing:

| | Grams/liter |
|---|---|
| $NaH_2PO_2$ | 678 |
| $Na_2HPO_3$ | 10.3 |
| $Na_2CO_3$ | 0.7 | was mixed with 127.25 pounds of 95 percent sulfuric acid and 59 pounds of water. Approximately half the solution was run into an insulated kettle equipped with a scraping blade agitator. The kettle also is equipped with cooling coils capable of reducing the temperature of the kettle contents to minus forty (—40) degrees centigrade. After the solution had been cooled to zero degrees centigrade, the heavy slurry which resulted was discharged into a centrifuge, and the solid phase separated, washed with water and discarded. This procedure was repeated with the second half of the original solution. The liquors remaining were combined and returned to the kettle, and the temperature reduced to minus thirty-nine (—39) degrees centigrade. When the slurry had reached this temperature it was centrifuged taking care to prevent any undue warming. The crystals were washed and discarded. The liquid phase had a specific gravity at twenty degrees centigrade at 1.294 and contained $H_3PO_2$, 64.2 percent by weight, sodium 9.0 grams per liter and $SO_4$ eighteen grams per liter. Thus, the hypophosphorous acid is contaminated by about 3.3 grams of sodium sulfate per 100 grams of hypophosphorous acid. Substantially no hypophosphite ion was lost in the discarded crystals. Of course, this solution can be diluted to any desired acid concentration.

EXAMPLE 6

A mixture of sodium bisulfate monohydrate [552 grams (4 moles)], of 86 percent (commercial) sodium hypophosphite [410 grams (4 moles)] and 820 milliliters of water was heated to cause solution. When cooled from 50 to 25 degrees centigrade, the turbidity decreased but did not disappear entirely. When cooled to 22–25 degrees centigrade and seeded with a crystal of Glauber's salt, crystallization occurred, and on cooling to twenty degrees centigrade, a heavy slurry formed which was filtered. The filtrate was successively cooled and filtered at zero degrees centigrade and at minus 25 (—25) degrees centigrade. Because the analysis of the mother liquor from this liquor showed sulfate ion equivalent to $Na_2SO_4$ of eleven grams per liter and a sodium ion equivalent to $Na_2SO_4$ of 35 grams per liter, sodium bisulfate in an amount sufficient to form sodium sulfate with the excess sodium ion was added. After cooling to minus thirty-nine (—39) degrees centigrade, the crystals of ice and sodium sulfate were removed to yield a mother liquor containing 57.0 percent hypophosphorous acid, 1.5 percent sodium sulfate and having a specific gravity at twenty degrees centigrade of 1.260.

Various modifications may be made in the process of the present invention without departing from the spirit or scope thereof, and it is to be understood that I limit myself only as defined in the appended claims.

I claim:
1. The process which comprises: forming a solution of a sodium phosphite containing sodium bisulfate, the ratio of sodium ion to sulfate ion mole concentration being about 2.0 to 1.0; cooling this solution to a minus twenty-three degree centigrade; separating the resulting crystals by filtration to yield an aqueous solution of phosphorous acid.

2. The process which comprises: forming a solution of a sodium phosphite containing sulfuric acid, the ratio of sodium ion to sulfate ion mole concentration being about 2.0 to 1.0; cooling this solution to a minus forty-four degrees centigrade; separating the resulting crystals by filtration to yield an aqueous solution of phosphorous acid.

3. The process which comprises: forming a solution of a sodium phosphate containing sulfuric acid, the ratio of sodium ion to sulfate ion mole concentration being about 2.0 to 1.0; cooling this solution to a minus twenty-three degrees centigrade; separating the resulting crystals by filtration to yield an aqueous solution of phosphoric acid.

4. The process which comprises: forming a solution of a sodium hypophosphite containing sulfuric acid, the ratio of sodium ion to sulfate ion mole concentration being between about 3.0 and 1.5 to 1.0; cooling this solution to at least a minus fifteen degrees centigrade; separating the resulting crystals by filtration to yield an aqueous solution of hypophosphorous acid.

5. The process which comprises: forming a solution of sodium hypophosphite containing sodium bisulfate, the ratio of sodium ion to sulfate ion mole concentration being between about 3.0 and 1.5 to 1.0; cooling this solution to at least a minus fifteen degrees centigrade; separating the resulting crystals by filtration to yield an aqueous solution of hypophosphorous acid.

6. The process which comprises: forming a solution of sodium hypophosphite containing sodium bisulfate, the ratio of sodium ion to sulfate ion mole concentration being about 2.0 to 1.0; cooling this solution to about a minus thirty degrees centigrade; separating the resulting crystals by filtration to yield an aqueous solution of hypophosphorous acid.

7. The process which comprises: forming a solution of sodium hypophosphite containing sulfuric acid, the ratio of sodium ion to sulfate ion mole concentration being about 2.0 to 1.0, cooling this solution to about a minus thirty degrees centigrade; separating the resulting crystals by filtration to yield an aqueous solution of hypophosphorous acid.

8. The process which comprises: forming a solution of sodium hypophosphite containing sodium bisulfate, the ratio of sodium ion to sulfate ion mole concentration being about 2.0 to 1.0; cooling this solution to a point slightly above the eutectic point of the mixture, separating the resulting crystals by filtration to yield an aqueous solution of hypophosphorous acid.

9. The process which comprises: forming a solution of sodium hypophosphite containing sulfuric acid, the ratio of sodium ion to sulfate ion mole concentration being about 2.0 to 1.0; cooling the solution to a point slightly above the eutectic point of the mixture; separating the resulting crystals by filtration to yield an aqueous solution of hypophosphorous acid.

References Cited in the file of this patent

UNITED STATES PATENTS

| 2,091,898 | Weber | Aug. 31, 1937 |
| 2,272,414 | McCullough | Feb. 10, 1942 |
| 2,275,825 | Lewis | Mar. 10, 1942 |
| 2,321,218 | Levermore | June 8, 1943 |
| 2,595,198 | Lefforge et al. | Apr. 29, 1952 |

FOREIGN PATENTS

| 105,071 | Australia | Sept. 15, 1938 |